E. OWEN.
Ditching Plow.
No. 3,757.
2 Sheets—Sheet 1.
Patented Sept. 24, 1844.
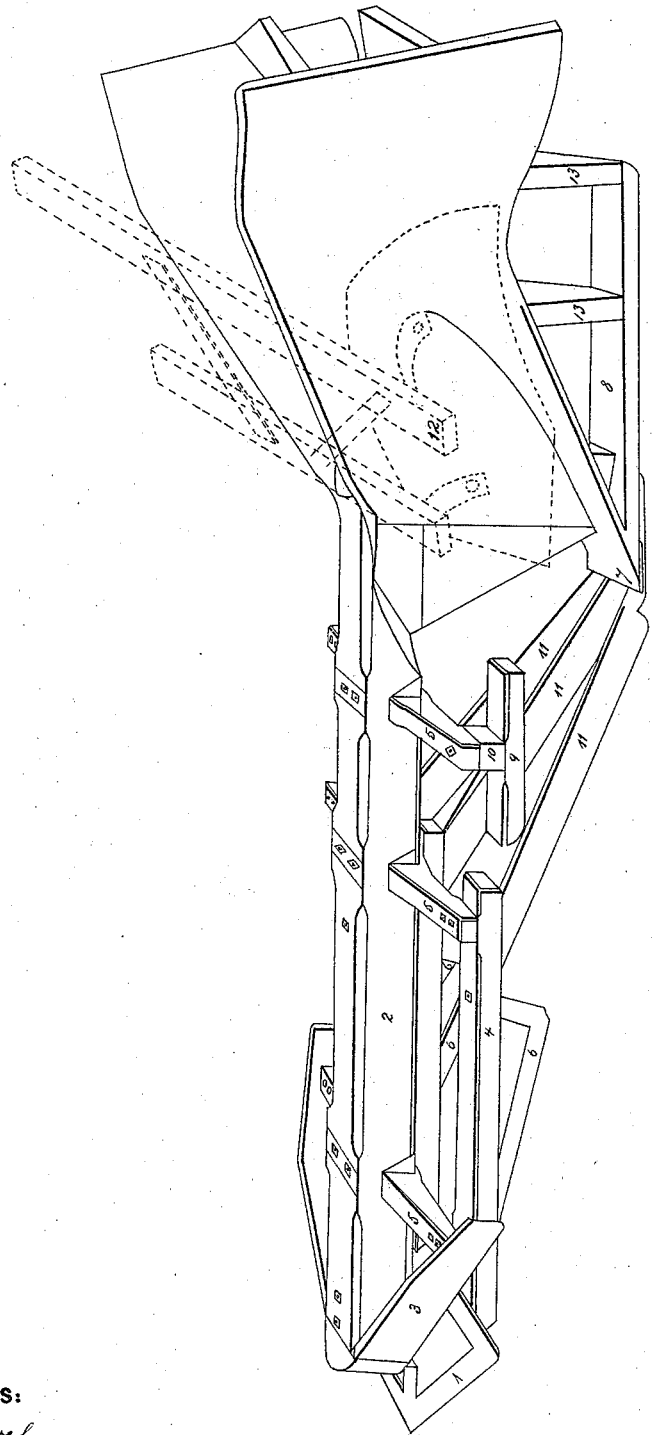
Witnesses:
Abm Fravel
Thos Payce
Inventor:
Edwin Owen

E. OWEN.
Ditching Plow.
No. 3,757. Patented Sept. 24, 1844.
2 Sheets—Sheet 2.
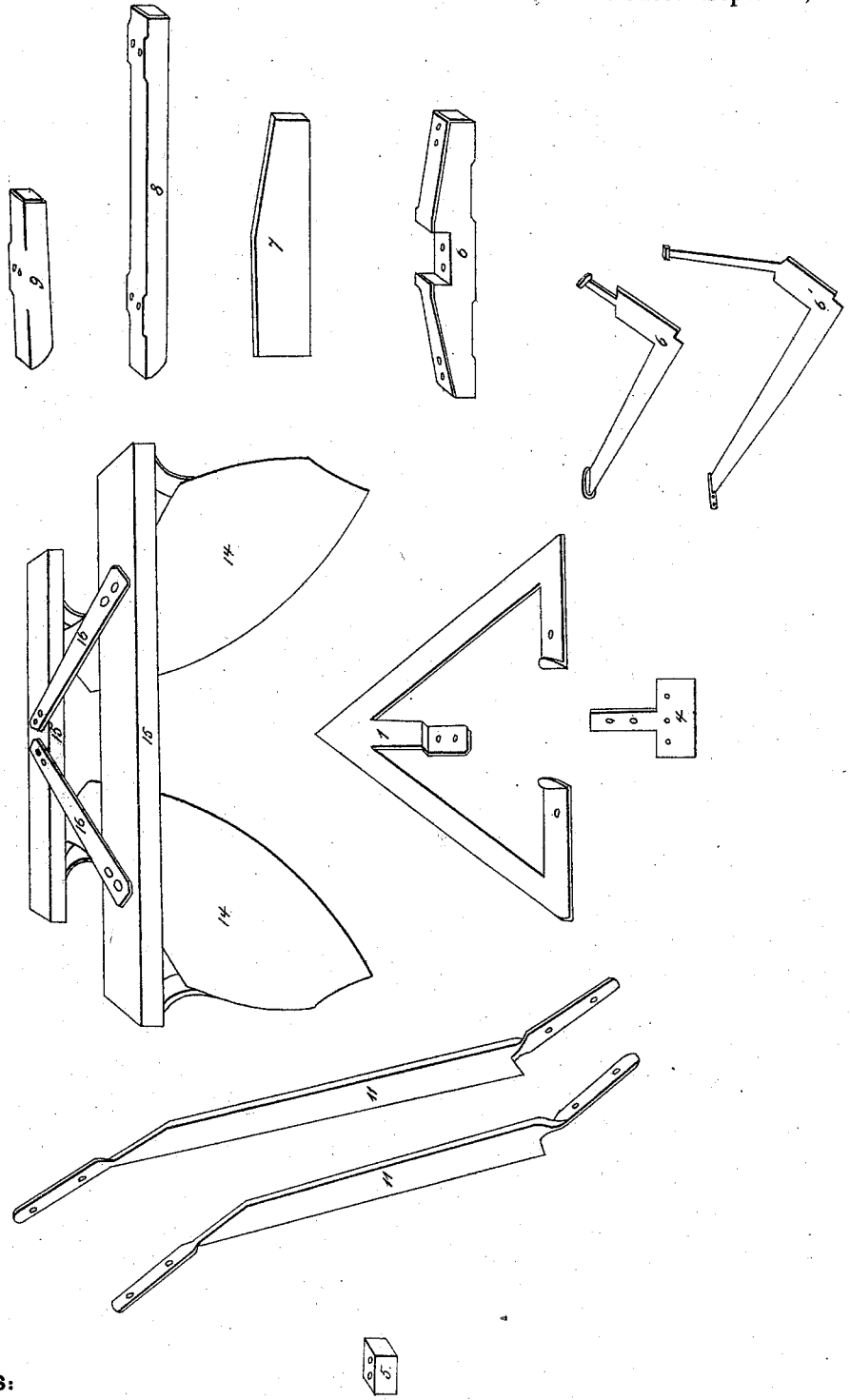
Witnesses:
Inventor:
Edwin Owen

UNITED STATES PATENT OFFICE.

EDWIN OWEN, OF LA PORTE, INDIANA.

IMPROVEMENT IN DITCHING-MACHINES.

Specification forming part of Letters Patent No. 3,757, dated September 24, 1844; antedated March 24, 1844.

*To all whom it may concern:*

Be it known that I, EDWIN OWEN, of La Porte, in the county of La Porte and State of Indiana, have invented a new and useful Improvement in Ditching-Machines; and I do hereby declare that the following is a full, clear, and exact description thereof, reference being had to the accompanying drawings, which form a part of this specification, in which—

Plate 1 is a perspective view. Plate 2 represents parts of the machine detached.

The nature of my invention consists in the arrangement and combination of two sets of knives and a double mold-board, so as to cut the soil from the ditch and elevate it on an embankment at one operation.

The machine is constructed as follows: A stout horizontal beam, 2, is the main support of the frame, and runs the whole length of the machine. On each side of this beam and there under it is a shorter one, 4, which I denominate "slides," and on them the machine rests and is moved. They are connected with the main beam by cross-beams 5, and their ends are rounded like runners. By them the depth of the ditch is gaged. Near the front end of the slides 4, which do not project as far forward as the center beam, there are shield-boards 3, which join in front of the beam and spread backward, and are braced out beyond the slides 4. Under these and in front is a horizontal triangular-shaped knife, 1, which is for the purpose of paring off bogs, brush, &c., while the shield-board removes to the sides all obstacles in front. To each of the slides there is attached a knife, 6, by one end, near the front end of the machine. It thence inclines downward and backward at an angle of about fifteen degrees from a horizontal line. Its lower end terminates in a shank that turns up about at right angles and is fastened to the slide. The two knives—one on each side—incline inward at their lower ends, so as to cut the sides of the ditch slanting. There is a third knife between these, and like them, only it neither inclines to the right or left. These knives serve to mark the ditch and cut through the upper sod. Directly behind them are three other knives, 11, the front ends of which are attached to the slides above named near their hind end, and extend downward similar to the knives 6, but at a more obtuse angle. These run under the point of the share 7, hereinafter described, where they are fastened as well as to the slide above. The knives are all shown detached in Plate 2, and designated by the same figures, as in Plate 1. The knives 11 cut the whole width and depth of the ditch, and by running under the point of the share they prevent the machine from becoming clogged, as when they strike an obstacle that cannot be severed by them they rise up over it.

A horizontal sole or share plank, 8, extends back from the share, and is confined by braces or posts 13 to the beam and mold-board 12. There are two wings or mold-boards, one on each side, with a curvature somewhat similar to a plow mold-board; but the lower edge inclines up from the point of the share backward at an angle of about twenty-five degrees to the level of the beam, and the wing then turns outward with a greater curve. The front edge of the mold-boards, where they meet, inclines backward from the beam down to the share. This is sharp, and the two mold-boards form a wedge to divide and raise the soil and cast it out on each side. These two wings 12 are firmly braced and connected permanently with the beam. They are made to fill the area of the cross-section of the ditch and lift out all the dirt therefrom.

Just behind the slides 4 are two shorter ones, 9, one only being shown in drawings. They are connected with a cross-beam, 5, attached to beam 2; a block, 10, being placed between said slides and beam 5, so as to elevate the machine when they rest on the ground. They are only used when the ditch is to be made shallow, and then the other slides can also be lowered to a level with them. In sandy or loose soil it is found that a difficulty arises in carrying out the dirt, as it falls as soon as it is above the surrounding surface. To remedy this I attach outside the mold-boards, and parallel with the surface thereof, shells or conductors, (shown separately in Plate 2, Figure 14, and in dotted lines in Plate 1.) They are united and sustained by being attached by their upper edges to two (more or less) cross-bars, 15, and braces 16, said bars being bolted on across the mold-board above.

The space between the slides and mold-boards is sufficient for the dirt to escape.

Having thus fully described my improvements and their operation, what I claim as my invention, and desire to secure by Letters Patent, is—

1. The combination of the triangular horizontal knife and shield, in the manner and for the purpose set forth.

2. The combination of the conductors with the mold-board, in the manner and for the purpose herein specified, said mold-board being made to slant under at its front edge to facilitate its clearing.

EDWIN OWEN.

Witnesses:
   T. C. DONN,
   JNO. L. SMITH.